United States Patent
Furumoto et al.

(10) Patent No.: US 8,536,288 B2
(45) Date of Patent: Sep. 17, 2013

(54) PROTEIN-ADSORBING MATERIAL AND METHOD FOR PRODUCING THE SAME

(75) Inventors: Goro Furumoto, Tokyo (JP); Noboru Kubota, Tokyo (JP); Kyoichi Saito, Chiba (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 369 days.

(21) Appl. No.: 12/744,066

(22) PCT Filed: Nov. 18, 2008

(86) PCT No.: PCT/JP2008/070923
§ 371 (c)(1),
(2), (4) Date: May 21, 2010

(87) PCT Pub. No.: WO2009/069504
PCT Pub. Date: Jun. 4, 2009

(65) Prior Publication Data
US 2010/0248954 A1    Sep. 30, 2010

(30) Foreign Application Priority Data

Nov. 26, 2007    (JP) .................................. 2007-304826

(51) Int. Cl.
C08F 2/04 (2006.01)
C08F 2/46 (2006.01)
C08F 224/00 (2006.01)
B01J 20/26 (2006.01)

(52) U.S. Cl.
USPC ............. 526/201; 526/273; 528/88; 502/401; 502/402

(58) Field of Classification Search
USPC ............ 502/400–402; 526/201, 273; 528/88
See application file for complete search history.

(56) References Cited

U.S. PATENT DOCUMENTS

| | | |
|---|---|---|
| 5,064,866 A | 11/1991 | Toyomoto et al. |
| 2003/0003554 A1 | 1/2003 | Miller et al. |
| 2004/0266896 A1 | 12/2004 | Britsch et al. |
| 2006/0040280 A1 | 2/2006 | Lee et al. |

FOREIGN PATENT DOCUMENTS

| | | |
|---|---|---|
| CA | 1223856 | 7/1987 |
| CA | 1223859 | 7/1987 |
| EP | 0346773 | 12/1989 |
| JP | 2-203933 | 8/1990 |
| JP | 9-299477 | 11/1997 |
| JP | 2006-26588 | 2/2006 |
| JP | 2007-159874 | 6/2007 |
| WO | 95/00533 | 1/1995 |
| WO | 03/046063 | 6/2003 |
| WO | 2006/121395 | 11/2006 |

OTHER PUBLICATIONS

Sigma-Aldrich, "Poly(glycidyl methacrylate)." (c) 2012. Viewed Sep. 12, 2012 at http://www.sigmaaldrich.com/catalog/product/ALDRICH/705314?lang=en&region=US.*
Unsal E et al., "Monodisperse porous polymer particles with polyionic ligands for ion exchange separation of proteins", Analytica Chimica ACTA, Elsevier, Amsterdam, NL, vol. 570, No. 2, Jun. 16, 2006, pp. 240-248.
Search report from E.P.O. that issued with respect to patent family member European Patent Application No. 08855723.6, mail date is May 27, 2011.
Saito et al., "To Recover Proteins not by Beads-Packed col. but by Using Porous Membrane Module" *Chemical Engineering*, pp. 25-28, 1996, along with an English language translation.
Kubota, N., "Radiation Graft Polymerization Method x Porous Filter Membrane = Birth of Adsorption Functional Membrane" *Radiation and Industry*, No. 80, pp. 45-47, 1998, along with an English language translation.
International Search Report for PCT/JP2008/070923, mailed Feb. 17, 2009.
International Preliminary Report on Patentability for PCT/JP2008/070923, mailed Jun. 17, 2010.

* cited by examiner

*Primary Examiner* — Stanley Silverman
*Assistant Examiner* — Daniel Berns
(74) *Attorney, Agent, or Firm* — Greenblum & Bernstein, P.L.C.

(57) ABSTRACT

An object of the invention is to provide a protein-adsorbing material having both adsorption capacity and high-speed treatment performance applicable to not only analysis use but also industrial use, in balance, and to provide a method for producing the same. The present invention provides a protein-adsorbing material comprising a polymer base-material, a polymer side-chain immobilized to the surface of the polymer base-material and a functional group having protein adsorption ability and immobilized to the polymer side-chain, in which the mass of the polymer side-chain is 5 to 30% relative to the mass of the polymer base-material.

4 Claims, No Drawings

PROTEIN-ADSORBING MATERIAL AND METHOD FOR PRODUCING THE SAME

TECHNICAL FIELD

The present invention relates to a protein-adsorbing material and a method for producing the same.

BACKGROUND ART

Conventionally, a purification operation by adsorption, such as recovering a valuable substance such as a protein by adsorption or removing impurities by adsorption, performed in a bioprocess, such as a pharmaceutical product production process, has been performed by passing a solution to be treated through a column charged with porous gel beads having a particle size beyond 100 μm and serving as an adsorbent. As the gel beads, beads formed of a polysaccharide such as cellulose, dextran and agarose are frequently used. These beads which are porous beads, have numeral micropores within a bead particle, and the beads acquire a capacity of adsorbing a desired substance by increasing a specific surface area by providing micropores. A crude-material solution, which contains a desired substance and impurities and obtained by e.g., cultivating, is passed through the column charged with the porous gel beads and the desired substance or impurities are separated by being adsorbed by a functional group having protein adsorption ability and immobilized to the micro pore surface when the solution passes through the micropores. However, conventional gel beads have a problem. A large resistance is offered to the migration of a substance into a gel bead particle, more specifically, to the diffusion of a substance through the micropores. Therefore, as the loading speed of a crude-material solution to a column increases, a functional group within micropores is not used for adsorption and only the functional group present on the outer surface of the gel bead particles are used for adsorption. As a result, an adsorption capacity greatly decreases. Purification by adsorption is not easily performed at a high speed.

On the other hand, gel beads formed of nonporous particles, in which only a functional group immobilized to the outer surface of the particles functions, have an advantage in that even if a loading speed of a liquid increases, a decrease of adsorption capacity is low. However, since the absolute value of the specific surface area of such gel beads is small, the adsorption capacity sufficient for industrial use is not easily obtained, and use of the gel beads mostly remains for analysis.

Furthermore, studies have been conducted on a method, in which a functional group is immobilized to a micropore surface of a porous membrane such as a micro filter and a solution to be treated is forcibly passed through micropores by filtration (see, for example, Non-Patent Documents 1 and 2). According to the method, even if a solution is loaded at a high speed, the functional group within a micropore can be efficiently used. Thus, a decrease of adsorption capacity rarely occurs.

Non-Patent Document 1: Kyoichi Saito et al., "Chemical Engineering", August issue, 1996, pp. 25-28

Non-Patent Document 2: Noboru Kubota, "Radiation and Industry", December, 1998, No. 80, pp. 45-47

DISCLOSURE OF THE INVENTION

Problems to be Solved by the Invention

However, when a porous membrane is used like in the methods described in Non-Patent Documents 1 and 2, a solution is passed by filtration, the thickness of the porous membrane has to be reduced to some extent such that filtration pressure may not be increased excessively high. If so, it is difficult to increase the adsorption capacity (absolute value) in the membrane-thickness direction.

It is an object of the present invention to provide a protein-adsorbing material having both an adsorption capacity and high-speed treatment performance applicable to not only analysis use but also industrial use in balance and providing a method of producing the same.

Means for Solving the Problem

The present inventors have conducted intensive studies with a view to solving the aforementioned problem, and, as a result, have found that both a high speed adsorption treatment and a high adsorption capacity can be attained in balance by immobilizing a polymer side-chain to which a functional group having protein adsorption ability is immobilized, to the surface of a polymer base-material, which may not be porous, at a predetermined ratio, and that a protein-adsorbing material having both a high-speed adsorption treatment and a high adsorption capacity in balance can be produced by use of a radiation graft polymerization method. As a result that the present inventors have further conducted intensive studies, they found that the amount of polymer side-chains to be formed on the surface of a base material can be maximized at an extremely small grafting ratio that may never ever been conceived, and have accomplished the present invention.

More specifically, the present invention is as follows.

(1) A protein-adsorbing material comprising a polymer base-material, a polymer side-chain immobilized to the surface of the polymer base-material and a functional group having protein adsorption ability and immobilized to the polymer side-chain, in which the mass of the polymer side-chain is 5 to 30% relative to the mass of the polymer base-material.

(2) The protein-adsorbing material according to above item (1) in which the polymer side-chain is obtained by polymerization of a vinyl monomer.

(3) The protein-adsorbing material according to above item (1) or (2), in which the polymer side-chain is immobilized to the surface of the polymer base-material by binding to a polymer constituting the polymer base-material and the functional group is immobilized by binding to the polymer side-chain.

(4) A method for producing a protein-adsorbing material comprising a first step of activating a polymer base-material; a second step of bringing, with the polymer base-material activated, a vinyl monomer having a functional group having protein adsorption ability or a vinyl monomer having a functional group, to which a functional group having protein adsorption ability can be introduced, into contact, thereby immobilizing a polymer side-chain formed by polymerization of the vinyl monomer to the surface of the polymer base-material; and a third step of introducing a functional group having protein adsorption ability into the functional group, to which the functional group having protein adsorption ability can be introduced, and which are present in the vinyl monomer, when the vinyl monomer does not have the functional group having protein adsorption ability, in which the mass of the polymer side-chain is 5 to 30% relative to the mass of the polymer base-material.

(5) The method for producing a protein-adsorbing material according to the above item (4), in which a polymer compound constituting the polymer base-material comprises polyethylene, and, in the first step, the polymer base-material is exposed to radiation with an irradiation dose of 1 to 20 kGy to activate the polymer base-material.

(6) The method for producing a protein-adsorbing material according to the above item (5), in which, in the second step, the polymer side-chain is immobilized in a solution of the vinyl monomer of 30° C. or less.

(7) The method for producing a protein-adsorbing material according to the above item (5) or (6), in which, in the second step, the vinyl monomer is brought into contact with the polymer base-material activated, in a solution prepared such that the concentration of the vinyl monomer is controlled to be not more than 10% by volume.

(8) The method for producing a protein-adsorbing material according to any one of the above items (5) to (7), in which the vinyl monomer comprises glycidyl methacrylate.

Advantage of the Invention

The present invention can provide a protein-adsorbing material having both an adsorption capacity and high-speed treatment performance applicable to not only analysis use but also industrial use in balance and provide a method for producing the same.

BEST MODE FOR CARRYING OUT OF THE INVENTION

The best mode for carrying out of the invention (hereinafter, referred to as "the embodiment") will be more specifically described below. Note that, the present invention is not limited to the following embodiment and may be carried out by modifying it within the gist of the embodiment.

The protein-adsorbing material according to the embodiment contains a polymer compound as a base material. In the specification, the base material is also described as a "polymer base-material".

The polymer compounds may include, for example, polyolefin such as polyethylene and polypropylene, halogenated polyolefin such as polyfluorinated vinylidene, a copolymer of an olefin and a halogenated olefin and a mixture of these. Of them, it is preferred that the polymer compound contains polyethylene. Polyethylene is available at low cost and excellent in chemical resistance and processability, and further, low in hygroscopic property and water absorptivity. In addition to this, polyethylene is rarely collapsed by radiation and relatively abundantly has crystal portions, which hold radicals from which a graft polymerization reaction triggered by radiation exposure is initiated. Therefore, polyethylene is suitable for radiation graft polymerization. The content of polyethylene in the polymer compound is preferably 50 to 100% by mass.

Polyethylene is roughly classified into low-density polyethylene and high-density polyethylene and both of them can be used in the embodiment. In view of stability of a polymer base-material in various environments used in practice, high-density polyethylene having a high degree of crystallization is relatively preferred.

Polyethylene may be a homopolymer of ethylene or may be a polymer to which propylene and butene are added in order to control linearity and density.

The larger the molecular weight of polyethylene, the more preferable in view of stability of a polymer base-material in various environments used in practice. Particularly, a super-high molecular weight type of polyethylene, which has a weight average molecular weight of 1 million or more, is preferred since mechanical properties thereof are also excellent. The weight average molecular weight used herein is obtained based on measurement by gel permeation chromatography using polystyrene as a reference material.

The form of a polymer base-material is not particularly limited and may be any one of the forms such as particle, non-woven cloth, woven cloth and filament form.

A particulate polymer base-material is preferable since it can be used as a filler to a conventional column. The particle may have true-spherical form or indeterminate form. Furthermore, a base material may be formed of primary particles, secondary particles, which are formed by coagulation of a plurality of primary particles into one body, or pulverized secondary particles.

A particle size of the particulate polymer base-material is preferably 10 to 80 μm in average. The average particle size is expressed by the arithmetic mean of sizes of not less than 50 particles. The particle size is expressed by an arithmetic mean, which is obtained by measuring the minor axis and the major axis of each of the particles in a magnified photograph thereof. When the average particle size is larger than 80 μm, the specific surface area decreases, with the result that the amount of functional group that can be introduced into a base material decreases and the adsorption capacity of a protein tends to decrease. When the average particle size is less than 10 μm, the space between particles decreases, with the result that pressure loss increases when a crude-material solution is passed through a column charged with a protein-adsorbing material, and consequently, excessive pressure tends to be required when a crude-material solution is supplied in practice. The particle size is preferably 10 to 40 μm in average.

The polymer base-material is preferably porous; however, a nonporous polymer base-material can be used. To use the nonporous polymer base-material as a protein-adsorbing material, a protein-adsorbing material attaining both the high-speed adsorption treatment and high adsorption capacity in balance must be realized and adsorption of a protein must be performed with a maximum efficiency. Then, how to design immobilization of a functional group having protein adsorption ability to a base material is the most important.

What is first required for immobilizing the functional group to a polymer base-material is immobilizing a polymer side-chain, via which the functional group is immobilized, to the base material. The polymer side-chain is immobilized to the base material, for example, by graft polymerization. By virtue of immobilization of a functional group in this manner, a functional group can be arranged not only on a base-material surface itself but also in the above space apart from the base-material surface via the polymer side-chain immobilized to the base-material surface. In a general method for immobilizing a functional group to a base material, the functional group is immobilized only to the base-material surface itself, that is, the two-dimensional surface. In contrast, in the method according to the embodiment, a functional group is immobilized via the polymer side-chain immobilized to a base material. By virtue of this structure, a three-dimensional space above the base material, in which a polymer side-chain is extended, can be used as an immobilization space for the functional group. Therefore, the method of the embodiment is overwhelmingly advantageous over the conventional method as mentioned above, in view of acquiring an adsorption capacity. The conventional method for immobilizing a functional group to a base-material surface with no polymer side-chain interposed between them has a so-called "adsorption space of a one-storied house type (plane surface type)"; whereas, the method according to the embodiment for immobilizing a functional group to a base material with a polymer side-chain immobilized thereto interposed between them has a so-called "adsorption space of a many-storied house type".

Note that, in the specification, immobilization of a polymer side-chain to a polymer base-material and immobilization of a functional group to a polymer side-chain respectively mean binding of the polymer side-chain to a compound constituting the polymer base-material and binding of the functional group to the polymer side-chain. The binding may be made by covalent bonding.

In the specification, the "polymer side-chain" refers to a polymer group capable of binding to a polymer compound constituting a polymer base-material and serving as a main chain, as a side chain. It is preferred that the polymer side-chain does not have many crosslinked structures. Since the molecule of a protein is generally large, it is difficult for a protein molecule to enter into a crosslinked structure or move within the crosslinked structure, for example, when a polymer side-chain has a crosslinked structure such as styrene-divinyl benzene. As a result, only a part of the polymer side-chain is involved in adsorption, and virtually, it is difficult to adsorb a protein. The polymer side-chain preferably has a highly flexible methylene chain as a main chain thereof. The polymer side-chain having a methylene chain as the main chain can be obtained, for example, by graft polymerization of a vinyl monomer to a base material. Particularly preferable polymer side-chain is a polyglycidyl methacrylate chain. This polymer side-chain can be formed by polymerization of glycidyl methacrylate, which is a vinyl monomer. Glycidyl methacrylate polymerized has a highly reactive glycidyl group. This is advantageous since various functional groups can be introduced into an epoxy ring present in the glycidyl group by a ring-opening addition reaction.

What is important to adsorb a protein with a maximum efficiency by immobilizing a functional group having protein adsorption ability to a polymer base-material via a polymer side-chain and additionally realizing further higher speed adsorption treatment and higher adsorption capacity in balance, is how to set the grafting ratio of a polymer side-chain and how to set the density of a polymer side-chain. The grafting ratio of a polymer side-chain (unit: %) is calculated by the expression:

(mass of polymer side-chain (unit: g))/(mass of polymer base-material before graft polymerization (unit: g))×100.

The density of a polymer side-chain is calculated by the expression:

(mass of polymer side-chain (unit: g))/(surface area of polymer base-material before graft polymerization (unit: $m^2$)).

The mass (unit: g) of a polymer side-chain is calculated by the expression:

(total mass (unit: g) of polymer base-material after graft polymerization and polymer side-chain)− (mass (unit: g) of polymer base-material before graft polymerization).

Generally, it is considered beneficial that a grafting ratio is increased to introduce a large number of functional groups, in order to attain the object of the invention. However, it is unexpectedly found that if the grafting ratio is excessively large, both the adsorption capacity and elution ratio of a protein-adsorbing material decrease. From this, it was found that there is a more preferable range of proper density of a polymer side-chain. The reason for these is not specifically elucidated; however, the present inventors presume the following one as one of the causes. That is, the polymer side-chains immobilized to a polymer base-material may conceivably present like "whiskers", which is immobilized on the surface of the base material. When the grafting ratio exceeds a predetermined level, it becomes difficult for a protein to enter into a layer of a polymer side-chain, and a three-dimensional many-storied adsorption space formed of the polymer side-chain layer is rarely used efficiently. As a result, an effective adsorption capacity may decrease. Furthermore, it becomes difficult for a part of proteins "entering into" the layer of a dense polymer side-chain to "creep out" of the polymer side-chain layer during elution treatment. An elution ratio or a recovery rate may possibly decrease.

Note that, the "elution ratio" refers to a ratio (%) of protein eluted from a protein-adsorbing material by an eluate based on the protein adsorbed to the protein-adsorbing material, and corresponds to a recovery rate of the protein adsorbed to a protein-adsorbing material.

Although the preferable range of the grafting ratio and density of a polymer side-chain according to the embodiment is significantly narrow compared to the preferable range so far presumed, the adsorption capacity is resulted in an increase. This is an extremely unexpected finding, which may not be obtained by extension of a conventional way of thinking.

The grafting ratio of a polymer side-chain immobilized to a polymer base-material falls within the range of 5 to 30%, and more preferably falls within the range of 10 to 20%. When the grafting ratio is less than 5%, a sufficient protein adsorption capacity cannot be obtained. When the grafting ratio is larger than 30%, an elution ratio decreases. Both cases are not preferable.

Furthermore, the density of a polymer side-chain immobilized to a polymer base-material is preferably 0.1 $g/m^2$ or more and less than 3 $g/m^2$, more preferably 0.2 to 1.5 $g/m^2$, and further preferably 0.3 $g/m^2$ or more and less than 1.0 $g/m^2$. In the range of the density less than 0.1 $g/m^2$, the adsorption capacity of a protein tends not to be sufficiently obtained. When the density is 3 g /$m^2$ or more, the elution ratio tends to decrease. Both cases are not preferable.

In either case, in the embodiment, compared to a conventional grafting technique for imparting a function, a grafting ratio is low and thus the amount of functional group to be introduced into a protein-adsorbing material is low. Nevertheless, the protein adsorption ability is improved. This should be said to be an unexpected result.

The protein-adsorbing material of the embodiment contains a functional group having protein adsorption ability. The "protein adsorption ability" used herein refers to an ability to adsorb a protein without modifying the molecule of the protein. A functional group having protein adsorption ability is roughly classified into four groups: (1) ion exchange adsorption type, (2) hydrophobic interaction adsorption type, (3) group-specific affinity adsorption type and (4) individual-specific affinity adsorption type. Specific examples are as follows.

The functional groups of the ion exchange adsorption type may include, for example, a cation group such as a sulfonic acid group, a carboxylic acid group and a phosphoric acid group; an anionic group such as a quaternary ammonium salt group, a pyridinium salt group and tertiary to secondary amino groups; and a chelate group such as an iminodiacetic acid group, a mercapto group and an ethylenediamine group.

The functional groups of the hydrophobic interaction adsorption type may include, for example, a phenyl group and an alkyl group.

The functional group of the group-specific affinity adsorption type may include, for example, a Cibacron Blue F3G-A, Protein A, concanavalin A, heparin, tannin and a metal chelate group.

The functional group of the individual-specific affinity adsorption type may include, for example, antigens and antibodies.

To a polymer side-chain immobilized to a polymer base-material, these functional groups having protein adsorption ability may be immobilized singly or in combination with two types or more. Furthermore, to the polymer side-chain, not only a functional group having protein adsorption ability but also a hydroxy group is desirably immobilized in order to suppress non-specific adsorption and non-reversible adsorption of a protein.

The protein-adsorbing material according to the embodiment, a functional group having protein adsorption ability is preferably contained in an amount of not less than 0.1 mmol/g per mass (dry mass) of the protein-adsorbing material. As described above, as a grafting ratio decreases, the amount of functional group decreases. However, if the grafting ratio of polymer side-chain immobilized to a polymer base-material falls within the above range, the larger the amount of functional group having protein adsorption ability to be immobilized to a polymer side-chain, the more preferable, since adsorption ability increases. The upper limit of the amount of functional group is substantially 0.5 mmol/g.

The protein-adsorbing material according to the embodiment is produced by, for example, a radiation graft polymerization method using a polymer compound as a base material. More specifically, the method for producing the protein-adsorbing material according to the embodiment contains a first step of activating a polymer base-material and a second step of bringing, with the polymer base-material activated, a vinyl monomer having a functional group having protein adsorption ability or a vinyl monomer having a functional group, to which a functional group having protein adsorption ability can be introduced, into contact, thereby immobilizing a polymer side-chain formed by polymerization of a vinyl monomer to the surface of the polymer base-material. The method for producing a protein-adsorbing material according to the embodiment may contain a third step of introducing a functional group having protein adsorption ability into the functional group (present in the vinyl monomer), to which the functional group having protein adsorption ability can be introduced, when the vinyl monomer does not have the functional group having protein adsorption ability.

The vinyl monomers having a functional group having protein adsorption ability and used in the second step may include, for example, sodium styrene sulfonate having a sulfonic acid group as a functional group; and an acrylic acid having a carboxyl group as a functional group. Furthermore, as the functional group to which a functional group having protein adsorption ability can be introduced, a highly reactive functional group is preferable and the functional groups may include, for example, an epoxy ring, a hydroxy group and an amino group. Of them, an epoxy ring, since it is reactive with a wide variety of molecules, is particularly used effectively as the functional group, to which a functional group having protein adsorption ability can be introduced. The vinyl monomers having a functional group, to which a functional group having protein adsorption ability can be introduced, may include glycidyl methacrylate having an epoxy ring as a functional group and vinyl acetate having an acetic acid ester residue capable of forming a hydroxy group by hydrolysis as a functional group. These may be used singly or as a mixture of two or more types. The vinyl monomer preferably contains glycidyl methacrylate. The amount of glycidyl methacrylate relative to the total amount of vinyl monomer is preferably 50 to 100% by mass.

Furthermore, as a method for introducing various functional groups having protein adsorption ability into an epoxy ring in the third step, the method described in e.g., Non-Patent Document 2 as mentioned above may be employed.

The polymer side-chain formed by polymerizing a vinyl monomer is a polymer side-chain (hereinafter referred to as a "graft polymer chain") formed by polymerizing a vinyl monomer in accordance with graft polymerization. Immobilization to a polymer base-material is initiated by activating the surface of the base material such that a vinyl monomer can be polymerized (in the first step). Methods for activating the base-material surface may include a method for generating radicals on the base-material surface. By virtue of this, graft polymerization of a vinyl monomer can be started using the generated radicals as a starting point. As a method for generating radicals on a base-material surface, radiation exposure for generating radicals is particularly preferable in view of generating radicals uniformly over the entire surface of the base material. A polymer chain may be produced by graft polymerization using radicals as a starting point. The radiation preferably used in the embodiment is ionizing radiation such as $\alpha$, $\beta$ and $\gamma$ beams and electron beam. Of these all of which can be used, particularly, an electron beam or a $\gamma$ beam is suitably used.

Note that, to immobilize a graft polymer side-chain with an appropriate density to a polymer base-material, it is important to set the amount of radicals to be generated, which serves as a starting point for graft polymerization, to fall within an appropriate range. Specifically, when a polymer base-material is activated by radiation exposure in the first step, the irradiation dose (of radiation) to a base material is important. In the embodiment, it is a key point that the irradiation dose (of radiation) is lower than conventional one. In particular, to efficiently produce a necessary amount of radicals when a polymer compound constituting a polymer base-material contains polyethylene, the irradiation dose is preferably 1 to 20 kGy, and further preferably 1 to 10 kGy. As previously described, in the embodiment, the density of polymer side-chains to be immobilized to the polymer base-material surface is important. The amount of radicals serving as an origin of grafting a polymer side-chain is determined by the irradiation dose. Therefore, if the irradiation dose is controlled to be within the above range, the structure of a polymer side-chain may conceivably be optimized.

Methods for grafting a polymer to a polymer base-material by use of radiation (hereinafter sometimes referred to as a "radiation graft polymerization method") may include, for example, a pre-irradiation method, in which a polymer base-material is previously exposed to radiation, and thereafter, brought into contact with a vinyl monomer at a radical serving as an origin; and a simultaneous radiation method, in which a vinyl monomer solution is exposed to radiation. Of these, the method capable of providing stable graft polymerization is the pre-irradiation method.

Methods for graft polymerization in accordance with radical polymerization by bringing a vinyl monomer into contact with radicals generated in a polymer base-material may include a gas-phase method, in which a vinyl monomer vaporized in a gas phase is brought into contact, and a liquid-phase method, in which a liquid-state vinyl monomer is directly brought into contact or a liquid-state vinyl monomer is diluted with a solvent and brought into contact in the solution. By the reason that a graft amount, in other words, the density of the polymer side-chain grafted to a base material, is easily controlled, the liquid-phase method, in which a vinyl monomer is diluted with a solvent and brought into contact in the solution, is preferable. As the solvent, a solvent having a small swelling property to a resin (polymer compound) constituting a base material is preferably used in order to limit a graft polymerization reaction to occur near the surface of the base material while suppressing the reaction from occurring in the innermost part of the base material (for example, in the case of using a particular base, in the innermost part of a particle). Specifically, a solvent having a degree of swelling the resin (constituting a base material) of 10% or less, is preferable. When the resin constituting a base material is polyethylene, for example, an alcohol such as methanol, ethanol, isopropyl alcohol and butanol etc., is preferably used as the solvent. The "degree of swelling" is expressed by a percentage value of the difference between "the diameter of a resin particle soaked in a solvent for one hour" at room temperature and "the diameter of a resin particle before soaking" divided by "the diameter of a resin particle before soaking".

When an alcohol is used as the solvent and glycidyl methacrylate is employed as the vinyl monomer, it is preferred that a polymer side-chain is immobilized in a vinyl monomer solution of 30° C. or less in order to conduct a grafting reaction between a polymer compound constituting a polymer base-material and glycidyl methacrylate in an alcohol solvent. At this time, when the temperature of the vinyl monomer solution exceeds 30° C., the reaction rate increases, with the result that it becomes difficult to control the reaction so as to have a predetermined grafting ratio. The temperature of the vinyl monomer solution is more preferably 0 to 20° C.

The concentration of a vinyl monomer in the vinyl monomer solution is preferably not more than 10% by volume. More specifically, the concentration of glycidyl methacrylate in an alcohol solvent is preferably not more than 10% by volume. When the concentration exceeds 10% by volume, it tends to be difficult to obtain a protein-adsorbing material having a large adsorption capacity.

The temperature of a reaction mixture and the concentration of glycidyl methacrylate conceivably have a large effect upon the density of a polymer side-chain to be formed on a polymer base-material surface. More specifically, it is considered that they may be important factors for forming a structure which allows protein molecules to easily enter into the space between polymer side-chains.

As a specific example of a particularly preferable method for producing a protein-adsorbing material according to the embodiment, a radiation graft polymerization method is mentioned using a polyethylene particle as a polymer base-material and glycidyl methacrylate as a vinyl monomer. The average size of the polyethylene particle is preferably 10 to 80 µm, more preferably, 10 to 60 µm, and further preferably 10 to 40 µm. As the radiation graft polymerization method, a pre-irradiation method is preferred. The graft polymerization of glycidyl methacrylate to a base material having radicals generated thereon is preferably performed in an alcohol solution of glycidyl methacrylate. As the alcohol, methanol, ethanol, isopropyl alcohol and butanol can be suitably used. As described above, an alcohol, which is a reaction solvent having a small swelling property to a resin constituting a base material, is preferably used in order to limit a graft polymerization reaction to occur near the surface of the base material while suppressing the reaction from occurring in the innermost part of particles of the base material. An alcohol has a small degree of swelling to polyethylene.

It is possible to control a grafting ratio by controlling the reaction temperature of the reaction solution, the concentration and reaction time of glycidyl methacrylate.

The grafting ratio of glycidyl methacrylate is preferably 5 to 30%, and more preferably 10 to 20%. It is possible to control the density of polymer side-chain to be immobilized to a polymer base-material within a preferably range by controlling the grafting ratio.

After glycidyl methacrylate is immobilized to a polymer base-material by graft polymerization, a functional group having protein adsorption ability may be introduced into a polymer side-chain, i.e., polyglycidyl methacrylate side chain. To do this, a functional group may be introduced to an epoxy ring of a glycidyl group in the polymer side-chain by a ring-opening addition reaction. For example, when a cationic exchange group is introduced as a functional group having protein adsorption ability, a sulphite can be added to a glycidyl group in the polymer side-chain immobilized by graft polymerization. More specifically, a method for introducing a sulfone group by reacting a base material, to which glycidyl methacrylate is immobilized by graft polymerization, and sodium sulphite in a solution mixture of water/isopropyl alcohol can be employed. Furthermore, for example, when an anionic exchange group is introduced as the functional group having protein adsorption ability, trimethylamine hydrochloride is reacted with a glycidyl group in the polymer side-chain immobilized by graft polymerization. In this way, a quaternary ammonium group can be introduced.

Note that, the surface area of a polymer base-material can be determined by a mercury press-in method. Furthermore, a protein-adsorbing material may be protein-adsorbing beads (in the form of beads).

EXAMPLES

The embodiment will be more specifically described by way of examples below; however, the embodiment is not be limited only to these examples.

Example 1

As a polymer base-material, super-high molecular weight polyethylene particles (GUR-2126, specific surface area: 0.18 $m^2$/g, manufactured by Ticona)—whose mass was previously measured—having an average particle size of 35 µm, were prepared. The polyethylene particles were exposed to an electron beam of 10 kGy to generate radicals.

After radicals were generated, the polyethylene particles were soaked in a 2% by volume glycidyl methacrylate/1-butanol solution and shaken at 5° C. for 150 hours to conduct a graft polymerization reaction. The particles obtained were washed with alcohol and dried, and then, mass was measured. The grafting ratio, as calculated from the mass, was 17%. The density of a polymer side-chain was 0.9 g/$m^2$.

The particles obtained were soaked in a solution of sodium sulfite: isopropanol: pure water=10:15:75 (% by mass) and shaken at 80° C. for 12 hours to introduce a sulfonic acid group serving as a functional group having protein adsorption ability into a glycidyl group. The particles having a sulfonic acid group introduced therein were dried and measured for mass. Based on the mass increased, the amount of sulfonic acid group immobilized was obtained. The amount of sulfonic acid group immobilized was 0.3 mmol/g. Furthermore, the particles having a sulfonic acid group introduced therein were soaked in a 0.5 mol/L aqueous sulfuric acid solution, and shaken at 80° C. for 2 hours to convert an unreacted glycidyl group to a diol. In this manner, a cationic protein-adsorbing beads serving as a protein-adsorbing material were obtained.

The protein-adsorbing beads obtained were loaded in a column having a sectional area of 0.39 $cm^2$ (height of charged beads: 3 cm), and tested for the following adsorption performance. First, a 2 g/L lysozyme solution (a 10 mmol aqueous solution of sodium carbonate/sodium hydroxide as a buffer solution, pH=9) was passed as a protein solution serving as a crude-material solution through the column from the top to the bottom at a space velocity of 200 h$^{-1}$. In this manner, an operation of adsorbing lysozyme was performed. A discharge solution from a liquid outlet port under the column was sampled, and the concentration of lysozyme in the discharge solution was monitored by absorptiometry (absorption wavelength: 280 nm). The concentration of lysozyme in the discharge solution was zero at the beginning; however, as the amount of solution to be loaded was increased, lysozyme gradually leaked out and the lysozyme concentration increased. An adsorption operation was continued until the concentration of lysozyme in the discharge solution reached the same concentration (2 g/L) as the original solution. The adsorption amount until the concentration of lysozyme in the discharge solution reached ¹⁄₁₀ that of the original solution was determined as a dynamic adsorption capacity. The adsorption amount until the concentration of lysozyme in the discharge solution reached the same as that of the original solution was determined an equivalent adsorption capacity. After completion of the adsorption operation, the buffer solution was passed through the column to wash it. Thereafter, a 0.5 mol/L aqueous sodium chloride solution was passed through the column as an eluate to elute lysozyme adsorbed to the protein-adsorbing material. An elution ratio was calculated in accordance with an expression: 100×(elution amount)/(equivalent adsorption amount (the same unit was used in the elution amount)). As a result, the dynamic adsorption capacity was 39 mg/mL (per column charge volume, the same shall apply hereinafter). The equivalent adsorption capacity was 60 mg/mL and the elution ratio was 100%.

Comparative Example 1

A comparative example where the irradiation dose was large and the grafting ratio was large, was performed as follows. Cationic protein-adsorbing beads were obtained in the same manner as in Example 1 except that the irradiation dose of the electron beam was changed from 10 kGy to 100 kGy and the time of the graft polymerization reaction was changed from 150 hours to 24 hours. The grafting ratio of the beads was 45% and the density of polymer side-chain was 2.5 g/m$^2$. The amount of sulfonic acid group immobilized was 1.2 mmol/g.

The protein-adsorbing beads obtained were tested for adsorption performance in the same manner as in Example 1. The dynamic adsorption capacity was 14 mg/mL, the equivalent adsorption capacity was 22 mg/mL, and the elution ratio was 90%. As a result, the adsorption capacity did not reach a half of that obtained in Example 1.

Comparative Example 2

A comparative example where reaction temperature was high and the grafting ratio was large was performed as follows. Cationic protein-adsorbing beads were obtained in the same manner as in Example 1 except that the reaction temperature of the graft polymerization was changed from 5° C. to 40° C. and the reaction time was changed from 150 hours to 2 hours. The grafting ratio of the beads was 41% and the density of polymer side-chain was 2.3 g/m$^2$. The amount of sulfonic acid group immobilized was 1.1 mmol/g.

The protein-adsorbing beads obtained were tested for adsorption performance in the same manner as in Example 1. The dynamic adsorption capacity was 20 mg/mL and the equivalent adsorption capacity was 31 mg/mL. They were about a half of those obtained in Example 1. Furthermore, the elution ratio was 85%. It was difficult to sufficiently recover the protein adsorbed.

Example 2

As a polymer base-material, super-high molecular weight polyethylene particles (GUR-2126, specific surface area: 0.18 m$^2$/g, manufactured by Ticona)—whose mass was previously measured—having an average particle size of 35 μm were prepared. The polyethylene particles were exposed to an electron beam of 10 kGy to generate radicals.

After radicals were generated, the polyethylene particles were soaked in a 2% by volume glycidyl methacrylate/1-butanol solution and shaken at 5° C. for 120 hours to perform a graft polymerization reaction. The particles obtained were washed with alcohol and dried, and mass was measured. The grafting ratio, as calculated from the mass, was 13%. The density of a polymer side-chain was 0.7 g/m$^2$.

The particles obtained were soaked in a 50% by volume aqueous diethylamine solution and shaken at 30° C. for 24 hours to introduce a diethyl amino group serving as a functional group having protein adsorption ability into a glycidyl group. The particles having a diethyl amino group introduced therein were dried and measured for mass. Based on the mass increased, the amount of diethyl amino group immobilized was obtained. The amount of diethyl amino group immobilized was 0.6 mmol/g. Next, the particles having a diethyl amino group introduced therein were soaked in a 50% by volume ethanolamine/methanol solution, and soaked at 30° C. for 24 hours to etanolaminate an unreacted glycidyl group. In this manner, an anionic protein-adsorbing beads serving as a protein-adsorbing material were obtained.

The protein-adsorbing beads obtained were loaded in the same column as used in Example 1 (height of charged beads: 3 cm), and tested for the following adsorption performance. First, a 1 g/L bovine serum albumin solution (20 mmol Tris-HCl buffer, pH=8) was passed as a protein solution serving as a crude-material solution through the column from the top to the bottom at a space velocity of 200 h$^{-1}$. In this manner, an operation of adsorbing albumin was performed. A discharge solution from a liquid outlet port under the column was sampled, and the concentration of albumin in the discharge solution was monitored by absorptiometry (absorption wavelength: 280 nm). The concentration of albumin in the discharge solution was zero at the beginning; however, as the amount of solution to be loaded was increased, albumin gradually leaked out and the albumin concentration increased. An adsorption operation was continued until the concentration of albumin in the discharge solution reached the same concentration (1 g/L) as the original solution. The adsorption amount until the concentration of albumin in the discharge solution reached ¹⁄₁₀ that of the original solution was determined as a dynamic adsorption capacity. The adsorption amount until the concentration of albumin in the discharge solution reached the same as that of the original solution was determined an equivalent adsorption capacity. After completion of the adsorption operation, the buffer solution was passed through the column to wash it. Thereafter, a 1 mol/L aqueous sodium chloride solution was passed through the column as an eluate to elute albumin adsorbed to the protein-adsorbing material. An elution ratio was calculated in accordance with an expression: 100×(elution amount)/(equivalent adsorption amount (the same unit used in the elution amount)). As a result, the dynamic adsorption capacity was 37 mg/mL, the equivalent adsorption capacity was 43 mg/mL and the elution ratio was 100%.

Example 3

Anionic protein-adsorbing beads were obtained in the same manner as in Example 2 except that the concentration of glycidyl methacrylate in the reaction solution was changed from 2% by volume to 15% by volume. The grafting ratio was 20%, the density of the polymer side-chain was 1.2 g/m$^2$, and the amount of diethyl amino group immobilized was 1.1 mmol/g.

As the protein-adsorbing beads obtained were tested for the adsorption performance in the same manner as in Example 2. The dynamic adsorption capacity was 18 mg/mL and the equivalent adsorption capacity was 66 mg/mL. The dynamic adsorption capacity was low compared to the equivalent adsorption capacity. Furthermore, the elution ratio was 95%.

Example 4

As a polymer base-material, super-high molecular weight polyethylene particles (GUR-2126, specific surface area: 0.18 m$^2$/g, manufactured by Ticona)—whose mass was previously measured—having an average particle size of 35 μm were prepared. The polyethylene particles were exposed to an electron beam of 1 kGy to generate radicals.

After radicals were generated, the polyethylene particles were soaked in a 10% by volume glycidyl methacrylate/1-butanol solution and shaken at 30° C. for 2 hours to perform a graft polymerization reaction. The particles obtained were washed with alcohol and dried, and then, mass was measured. The grafting ratio, as calculated from the mass, was 21%. The density of a polymer side-chain was 1.2 g/m$^2$.

To the particles obtained, a sulfone acid group serving as a functional group having protein adsorption ability was introduced in the same manner as in Example 1. The amount of sulfonic acid group immobilized was 0.5 mmol/g.

Furthermore, unreacted glycidyl group was converted into a diol in the same manner as in Example 1. In this manner, cationic protein-adsorbing beads were obtained as a protein-adsorbing material.

The protein-adsorbing beads obtained were tested for adsorption performance in the same manner as in Example 1. The dynamic adsorption capacity was 38 mg/mL and the equivalent adsorption capacity was 55 mg/mL. Furthermore, the elution ratio was 98%. The protein was almost completely recovered.

Example 5

As a polymer base-material, super-high molecular weight polyethylene particles (GUR-2126, specific surface area: 0.18 m$^2$/g, manufactured by Ticona)—whose mass was previously measured—having an average particle size of 35 μm were prepared. The polyethylene particles were exposed to y beam of 10 kGy to generate radicals.

After radicals were generated, the polyethylene particles were soaked in a 4% by volume glycidyl methacrylate/1-butanol solution and shaken at 5° C. for 100 hours to perform a graft polymerization reaction. The particles obtained were washed with alcohol and dried, and then, mass was measured. The grafting ratio, as calculated from the mass, was 10%. The density of a polymer side-chain was 0.5 g/m$^2$.

The particles obtained were soaked in a solution of sodium sulfite: isopropanol: pure water=10:15:75 (% by mass) and shaken at 80° C. for 12 hours to introduce a sulfonic acid group serving as a functional group having protein adsorption ability into a glycidyl group. The particles having a sulfonic acid group introduced therein were dried and measured for mass. Based on the mass increased, the amount of sulfonic acid group immobilized was obtained. The amount of sulfonic acid group immobilized was 0.2 mmol/g. Furthermore, the particles having a sulfonic acid group introduced therein were soaked in a 0.5 mol/L aqueous sulfuric acid solution and shaken at 80° C. for 2 hours to convert an unreacted glycidyl group to a diol. In this manner, a cationic protein-adsorbing beads serving as a protein-adsorbing material were obtained.

The protein-adsorbing beads obtained were tested for adsorption performance in the same manner as in Example 1. The dynamic adsorption capacity was 28 mg/mL and the equivalent adsorption capacity was 41 mg/mL. The elution ratio was 100%.

The present application was based on Japanese Patent Application (Application No. 2007-304826) filed on Nov. 26, 2007 and the content thereof is incorporated by reference herein.

Industrial Applicability

According to the present invention, it is possible to provide a protein-adsorbing material, which is suitably used in a purification operation by adsorption, such as recovering a valuable substance such as a protein by adsorption, and removing impurities by adsorption in a bioprocess such as a pharmaceutical product production process, and which allows purification by adsorption at a high speed and with a high adsorption capacity. More specifically, the protein-adsorbing material of the present invention reduces a limitation on substance migration in an adsorbing material and diffusion resistance into micropores, thereby adsorbing and purifying a large molecule such as a protein. Accordingly, it is possible to provide a protein-adsorbing material having both an adsorption capacity (the adsorption capacity is not an equivalent adsorption capacity but the capacity of adsorbing until adsorption leakage cannot be ignored during adsorption treatment, that is, a dynamic adsorption capacity) applicable for industrial use or analysis use and high-speed treatment performance in balance, and to provide a method for producing the same.

The invention claimed is:

1. A method for producing a protein-adsorbing material comprising
activating a polymer base-material by exposing said polymer base-material to radiation with an irradiation dose of 1 to 20 kGy;
bringing, with said polymer base-material activated, a vinyl monomer having a functional group having protein adsorption ability or a vinyl monomer having a functional group, to which a functional group having protein adsorption ability can be introduced, into contact, in a solution of the vinyl monomer, at 20° C. or less and for a period of 100 to 150 hours, thereby immobilizing a polymer side-chain formed by polymerization of said vinyl monomer to the surface of said polymer base-material and
introducing a functional group having protein adsorption ability into said functional group, to which the functional group having protein adsorption ability can be introduced, and which is present in said vinyl monomer, when said vinyl monomer does not have said functional group having protein adsorption ability,
wherein the mass of said polymer side-chain is 5 to 30% relative to the mass of said polymer base-material.

2. The method for producing a protein-adsorbing material according to claim 1, wherein a polymer compound constituting said polymer base-material comprises polyethylene.

3. The method for producing a protein-adsorbing material according to claim 2, wherein, in said second step, said vinyl monomer is brought into contact with said polymer base-material activated, in a solution prepared such that the concentration of said vinyl monomer is controlled to be not more than 10% by volume.

4. The method for producing a protein-adsorbing material according to claim 2, wherein the vinyl monomer comprises glycidyl methacrylate.

* * * * *